(12) United States Patent
Lee

(10) Patent No.: US 10,700,734 B2
(45) Date of Patent: Jun. 30, 2020

(54) RECEIVER DEVICES, TRANSMITTER DEVICES, METHODS FOR CONTROLLING A RECEIVER DEVICE, METHODS FOR CONTROLLING A TRANSMITTER DEVICE, AND COMPUTER-READABLE MEDIA

(71) Applicant: RAZER (ASIA-PACIFIC) PTE. LTD., Singapore (SG)

(72) Inventor: Kah Yong Lee, Singapore (SG)

(73) Assignee: RAZER (ASIA-PACIFIC) PTE. LTD., Singapore (SG)

(*) Notice: Subject to any disclaimer, the term of this patent is extended or adjusted under 35 U.S.C. 154(b) by 0 days.

(21) Appl. No.: 16/321,010

(22) PCT Filed: Jul. 28, 2016

(86) PCT No.: PCT/SG2016/050360
§ 371 (c)(1),
(2) Date: Jan. 25, 2019

(87) PCT Pub. No.: WO2018/021960
PCT Pub. Date: Feb. 1, 2018

(65) Prior Publication Data
US 2019/0181909 A1    Jun. 13, 2019

(51) Int. Cl.
*H04B 1/713* (2011.01)
*H04L 1/00* (2006.01)
(Continued)

(52) U.S. Cl.
CPC .............. *H04B 1/713* (2013.01); *H04L 1/00* (2013.01); *H04L 1/188* (2013.01); *H04L 1/1848* (2013.01);
(Continued)

(58) Field of Classification Search
CPC combination set(s) only.
See application file for complete search history.

(56) References Cited

U.S. PATENT DOCUMENTS

| 5,572,546 A | 11/1996 | Serfaty et al. |
| 7,716,379 B2 | 5/2010 | Ruan et al. |
| (Continued) | | |

FOREIGN PATENT DOCUMENTS

| CN | 101938784 A | 1/2011 |
| CN | 101969369 A | 2/2011 |
| (Continued) | | |

OTHER PUBLICATIONS

International Search Report and Written Opinion, dated Apr. 25, 2017, for the corresponding International Application No. PCT/SG2016/050360 in 11 pages.
(Continued)

*Primary Examiner* — Linda Wong
(74) *Attorney, Agent, or Firm* — Polsinelli PC

(57) ABSTRACT

According to various embodiments, a receiver device may be provided. The receiver device may include: a receiver circuit configured to receive a data packet according to a data format on a pre-determined radio frequency, wherein the data format comprises a parameter indicating a number of retries of transmission of the data packet; a determination circuit configured to determine whether the parameter is higher than a pre-determined threshold; and a frequency changer circuit configured to change a frequency on which the receiver receives data based on the determination.

18 Claims, 9 Drawing Sheets

(51) Int. Cl.
  *H04L 5/00* (2006.01)
  *H04L 1/18* (2006.01)
(52) U.S. Cl.
  CPC .. *H04L 5/0012* (2013.01); *H04B 2201/71361* (2013.01)

(56) References Cited

U.S. PATENT DOCUMENTS

| | | | |
|---|---|---|---|
| 7,809,371 B2* | 10/2010 | Nishio | H04W 52/50 455/434 |
| 8,712,483 B2 | 4/2014 | Haartsen et al. | |
| 8,774,718 B2 | 7/2014 | Paycher et al. | |
| 8,780,755 B1 | 7/2014 | Gopi et al. | |
| 8,908,626 B2 | 12/2014 | Hui et al. | |
| 9,106,320 B1 | 8/2015 | Rasband et al. | |
| 9,246,845 B2 | 1/2016 | Hui et al. | |
| 9,362,978 B2 | 6/2016 | Mason, Jr. et al. | |
| 2004/0237016 A1* | 11/2004 | Sudo | H04L 1/0059 714/748 |
| 2006/0035590 A1 | 2/2006 | Morris et al. | |
| 2007/0092020 A1* | 4/2007 | Seki | H04L 5/0058 375/267 |
| 2008/0082891 A1* | 4/2008 | Park | H04L 1/1621 714/749 |
| 2010/0146355 A1* | 6/2010 | Jiang | H04L 1/1671 714/749 |
| 2010/0304702 A1* | 12/2010 | Anzures | H04H 20/22 455/313 |
| 2011/0317563 A1* | 12/2011 | Ishii | H04L 1/1887 370/241 |
| 2012/0119902 A1 | 5/2012 | Patro et al. | |
| 2012/0236706 A1 | 9/2012 | Ambuehl et al. | |
| 2012/0236933 A1* | 9/2012 | Saitoh | H04N 5/4401 375/240.02 |
| 2012/0264385 A1 | 10/2012 | Oh et al. | |
| 2012/0269054 A1* | 10/2012 | Fukushima | H04L 1/1642 370/216 |
| 2013/0194100 A1* | 8/2013 | Granhed | A63B 29/021 340/584 |
| 2013/0249306 A1* | 9/2013 | Kim | H02J 5/005 307/104 |
| 2014/0225775 A1 | 8/2014 | Clevorn et al. | |
| 2015/0099535 A1 | 4/2015 | Bombacino et al. | |
| 2015/0166075 A1* | 6/2015 | Nam | H04W 52/0238 701/2 |
| 2015/0230206 A1* | 8/2015 | Tabet | H04W 72/02 370/329 |
| 2015/0372789 A1* | 12/2015 | Fan | H04L 1/1812 370/252 |
| 2015/0382395 A1* | 12/2015 | Yang | H04L 1/188 370/216 |
| 2016/0150501 A1 | 5/2016 | Hui et al. | |
| 2016/0165557 A1 | 6/2016 | Alexander et al. | |
| 2016/0262185 A1* | 9/2016 | Ghosh | H04W 74/085 |
| 2017/0244468 A1* | 8/2017 | Zhao | H04W 36/06 |
| 2017/0285105 A1* | 10/2017 | Uemura | H04B 7/061 |

FOREIGN PATENT DOCUMENTS

| | | |
|---|---|---|
| CN | 102291794 A | 12/2011 |
| CN | 105337637 A | 2/2016 |

OTHER PUBLICATIONS

M. Dunbar, "Bluetooth goes industrial [radio communication standard]", Control Solutions, v 74, n 2, 54-8, Feb. 2001 in 1 page [abstract].

J. Huovinen, et al., "Demonstration of synchronization method for frequency hopping ad hoc network", Centre for Wireless Communications, University of Oulu, Finland, MILCOM 2008—2008 IEEE Military Communications Conference, 7 pp., 2008, total 8 pages.

Extended European Search Report, dated Jun. 19, 2019, for the corresponding European Application No. 16910669.7 in 7 pages.

Office Action (including English Translation) dated Apr. 22, 2020, for the corresponding Chinese Application No. 201680089625.7 in 28 total pages.

* cited by examiner

RECEIVER DEVICES, TRANSMITTER DEVICES, METHODS FOR CONTROLLING A RECEIVER DEVICE, METHODS FOR CONTROLLING A TRANSMITTER DEVICE, AND COMPUTER-READABLE MEDIA

TECHNICAL FIELD

Various embodiments generally relate to receiver devices, transmitter devices, methods for controlling a receiver device, methods for controlling a transmitter device, and computer-readable media.

BACKGROUND

Frequency agility (or slow frequency hopping) technique may be commonly used in cordless mouse design in order to mitigate the negative effects of interference induced by collocated wireless networks. This kind of frequency hopping technique may be preferred as it has superior transmission rate and lower power consumption as compared to conventional frequency hopping method. Conventionally used frequency hopping methods may hop across the entire frequency band in random and periodic fashion. One example of frequency hopping system is Bluetooth. Bluetooth devices may use 79 of the 83.5 available channels in the 2.4 GHz band, hopping across these channels in a random fashion and at a rate of 1600 times per second. The drawback is that as soon as another wireless device is introduced into the environment this type of hopping results in occasional collisions. Thus, there may be a need for improved methods and devices.

SUMMARY OF THE INVENTION

According to various embodiments, a receiver device may be provided. The receiver device may include: a receiver circuit configured to receive a data packet according to a data format on a pre-determined radio frequency, wherein the data format includes a parameter indicating a number of retries of transmission of the data packet; a determination circuit configured to determine whether the parameter is higher than a pre-determined threshold; and a frequency changer circuit configured to change a frequency on which the receiver receives data based on the determination.

According to various embodiments, a transmitter device may be provided. The transmitter device may include: a transmitter circuit configured to transmit a data packet according to a data format on a pre-determined radio frequency, wherein the data format includes a parameter indicating a number of retries of transmission of the data packet; an acknowledgement determination circuit configured to determine whether an acknowledgement for reception of the data pack is received in the transmitter device, wherein the transmitter circuit is configured to increase the parameter and re-transmit the data packet with the increased parameter if the acknowledgement determination circuit determines that an acknowledgement for reception of the data pack is not received in the transmitter device; a determination circuit configured to determine whether the value of the parameter is higher than a pre-determined threshold; and a frequency changer circuit configured to change a frequency on which the transmitter transmits data based on the determination.

According to various embodiments, a method for controlling a receiver device may be provided. The method may include: receiving a data packet according to a data format on a pre-determined radio frequency, wherein the data format includes a parameter indicating a number of retries of transmission of the data packet; determining whether the parameter is higher than a pre-determined threshold; and changing a frequency on which the receiver receives data based on the determining.

According to various embodiments, a method for controlling a transmitter device may be provided. The method may include: transmitting a data packet according to a data format on a pre-determined radio frequency, wherein the data format includes a parameter indicating a number of retries of transmission of the data packet; determining whether an acknowledgement for reception of the data pack is received in the transmitter device, wherein the parameter is increased and the data packet is re-transmitted with the increased parameter if it is determined that an acknowledgement for reception of the data pack is not received in the transmitter device; determining whether the value of the parameter is higher than a pre-determined threshold; and changing a frequency on which the transmitter transmits data based on the determining.

According to various embodiments, a computer-readable medium may be provided. The computer-readable medium may include instructions which, when executed by a computer, make the computer perform a method for controlling a receiver device. The method may include: receiving a data packet according to a data format on a pre-determined radio frequency, wherein the data format includes a parameter indicating a number of retries of transmission of the data packet; determining whether the parameter is higher than a pre-determined threshold; and changing a frequency on which the receiver receives data based on the determining.

According to various embodiments, a computer-readable medium may be provided. The computer-readable medium may include instructions which, when executed by a computer, make the computer perform a method for controlling a transmitter device. The method may include: transmitting a data packet according to a data format on a pre-determined radio frequency, wherein the data format includes a parameter indicating a number of retries of transmission of the data packet; determining whether an acknowledgement for reception of the data pack is received in the transmitter device, wherein the parameter is increased and the data packet is re-transmitted with the increased parameter if it is determined that an acknowledgement for reception of the data pack is not received in the transmitter device; determining whether the value of the parameter is higher than a pre-determined threshold; and changing a frequency on which the transmitter transmits data based on the determining.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which.

DETAILED DESCRIPTION

Figure 1:
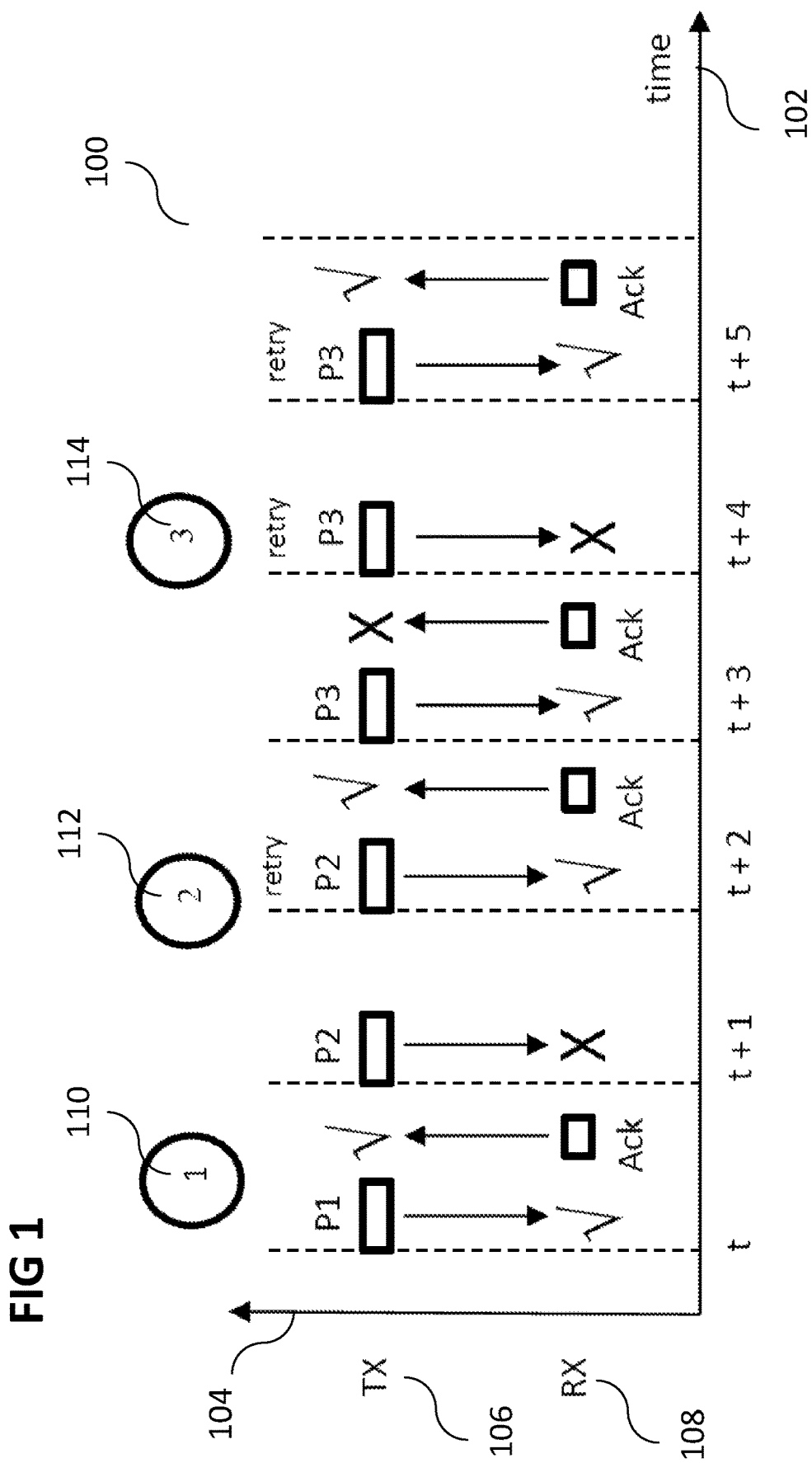
FIG. 1 shows an illustration of various scenarios which may happen when a transmitter device sends a data packet to receiver device.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In this context, the receiver device as described in this description may include a memory which is for example used in the processing carried out in the receiver device. In this context, the transmitter device as described in this description may include a memory which is for example used in the processing carried out in the transmitter device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

It will be understood that a transmitter device may be referred to as a transmitter, and that a receiver device may be referred to as a receiver.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

Frequency agility (or slow frequency hopping) technique may be commonly used in cordless mouse design in order to mitigate the negative effects of interference induced by collocated wireless networks. This kind of frequency hopping technique may be preferred as it has superior transmission rate and lower power consumption as compared to conventional frequency hopping method. Conventionally used frequency hopping methods may hop across the entire frequency band in random and periodic fashion. One example of frequency hopping system is Bluetooth. Bluetooth devices may use 79 of the 83.5 available channels in the 2.4 GHz band, hopping across these channels in a random fashion and at a rate of 1600 times per second. The drawback is that as soon as another wireless device is introduced into the environment this type of hopping results in occasional collisions. According to various embodiments, improved methods and devices may be provided.

A challenge of frequency agility hopping method may be the synchronization of the hopping sequence between transmitter and receiver device as both devices experience different channel condition due to the nature of the wireless environment.

FIG. 1 shows an illustration 100 of various scenarios which may happen when a transmitter device sends a data packet to receiver device. A horizontal axis 102 illustrates time, and on a vertical axis 104, transmission (TX) 106 and reception (RX) 108 of data is illustrated. Data packets (for example P1, P2, or P3) or acknowledgement signals (ACK)

which are received properly (in other words: correctly) are indicated by a check sign (√). Packets (for example P1, P2, or P3) or acknowledgement signals (ACK) which are not received properly (in other words: which are lost) are indicated by a cross sign (X).

In a first scenario, indicated by circled 1 and denoted by reference sign 110, a data packet P1 is received by receiver unit correctly, and the acknowledgement packet is received by transmitter unit correctly.

In a second scenario, indicated by circled 2 and denoted by reference sign 112, a first data packet P2 transmission (in other words: first transmission of data packet P2) is lost. A retry (in other words: a second try) of transmission of data packet P2 is received by receiver unit correctly and the acknowledgement packet is received by transmitter unit correctly.

In a third scenario, indicated by circled 3 and denoted by reference sign 114, a first transmission of data packet P3 is received by receiver unit correctly. But the acknowledgement packet is lost or is not received by transmitter device. A second transmission of P2 (in other words: a second try) is lost or is not received by receiver unit correctly. Only the third try (in other words: second retry) is successful.

In frequency agile system, transmitter and receiver may switch to the next channel based on the following error conditions:

1. The transmitter may switch to the next channel when it exhausts the predefine number of re-transmission.

2. The receiver may switch to the next channel when the timeout period expired.

Figure 2:
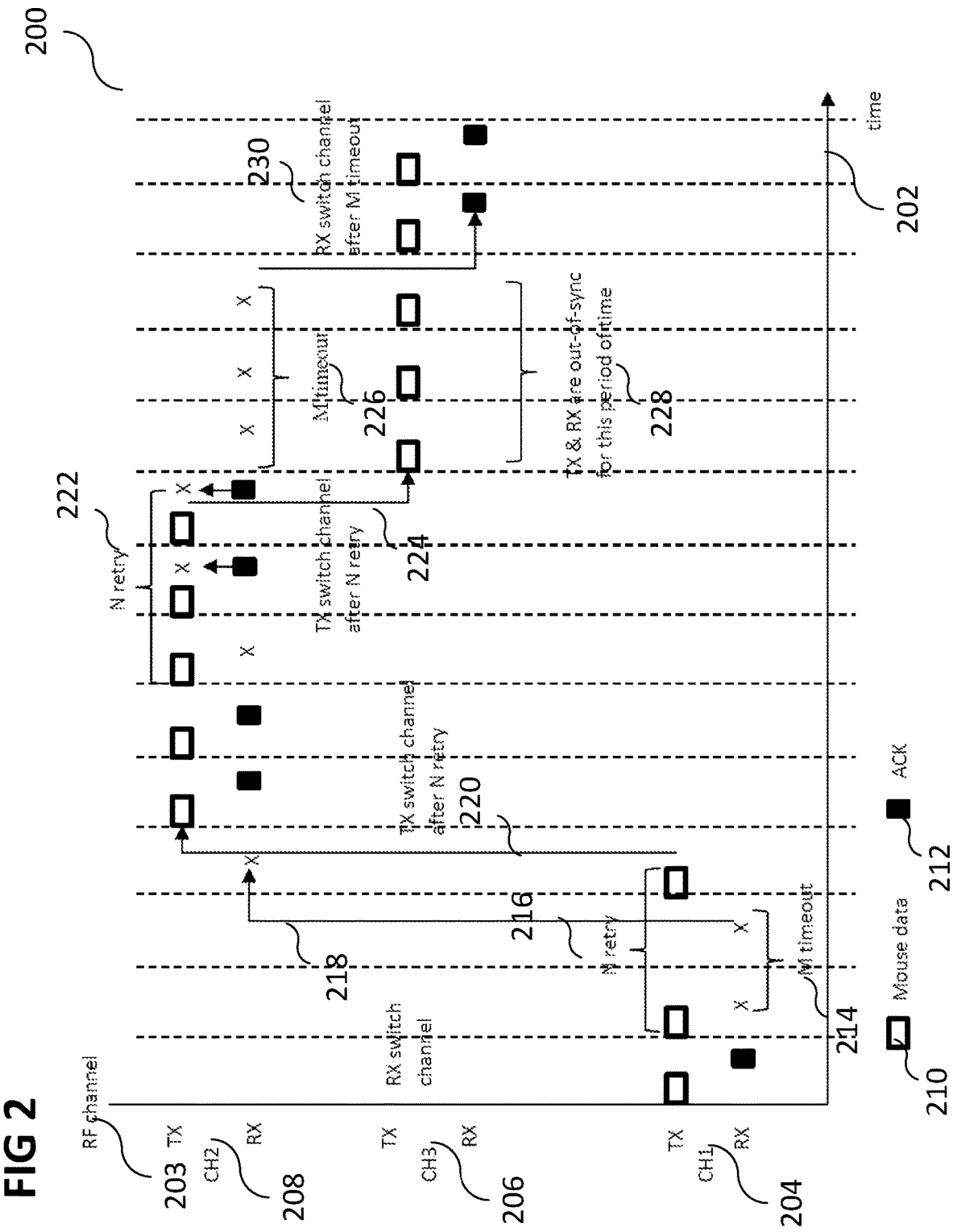
FIG. 2 shows an illustration of a scenario of a currently used cordless mouse implementation.

FIG. 2 shows an illustration 200 of a scenario of a currently used cordless mouse implementation. A horizontal axis 202 indicates time, and on a vertical axis 203, transmitter (TX) and receiver (RX) channels of a first channel 204, of a second channel 206 and of a third channel 208 are shown. Mouse data is indicated by unfilled boxes (like 210), ACK data is indicated by filled boxes (like 212), and lost data is indicated by X.

For example, starting on the first channel 204 (CH1), the receiver RX may switch channel to the second channel 208 (CH2), like indicated by 218, after a pre-determined timeout (for example M timeout, like indicated by 214). The transmitter TX may switch channel to the second channel 208 (CH2), like indicated by 220, after a pre-determined number of retries (for example N retries timeout, like indicated by 216). When communicating using the second channel 208, after N retries, like indicated by 222, the TX may switch the channel to the third channel (CH3) 206, like indicated by 224. After M timeouts, like indicated by 226, the RX may switch to the third channel 206, like indicated by 230. Thus, for a period of time 228, the TX and RX may be out-of-sync (in other words: may communicate on different channels).

As described above, the transmitter (TX) and receiver (RX) may be out-sync (in other words: out-of-sync) for the period of time 228 when they experience different wireless channel conditions. The receiver RX may be slow to switch to next channel in 230, because the RX may be able to receive mouse data from TX (during the period during which the TX already performs retries, like indicated by 222). However the TX is not able to receive the ACK packet due to interference or fading condition (and thus the TX is counting the numbers of retries in 222). Hence, there may be the period of time 228 when TX and RX are not in the same RF frequency channel.

Various embodiments may solve the out-of-sync issue faced by TX and RX. Various embodiments may allow TX and RX to switch channel synchronously regardless of the transmission result at both ends.

According to various embodiments, systems, apparatuses, and methods to synchronize frequency switching for cordless mouse may be provided.

Figure 3A:
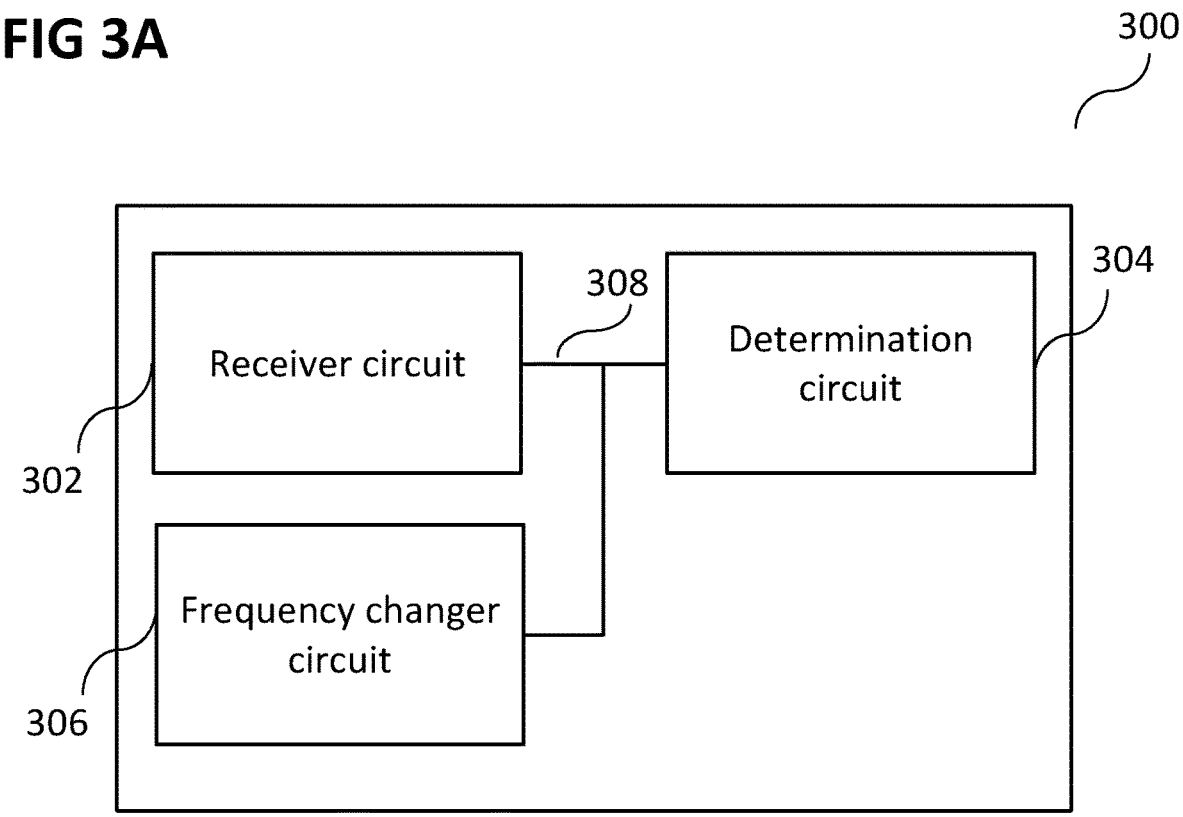
FIG. 3A shows a receiver device according to various embodiments.

FIG. 3A shows a receiver device 300 according to various embodiments. The receiver device 300 may include a receiver circuit 302 configured to receive a data packet according to a data format on a pre-determined radio frequency. The data format may include a parameter indicating a number of retries of transmission of the data packet. The receiver device 300 may further include a determination circuit 304 configured to determine whether the parameter is higher than a pre-determined threshold. The receiver device 300 may further include a frequency changer circuit 306 configured to change a frequency on which the receiver receives data based on the determination. The receiver circuit 302, the determination circuit 304, and the frequency changer circuit 306 may be coupled with each other, like indicated by lines 308, for example electrically coupled, for example using a line or a cable, and/or mechanically coupled.

In other words, in each packet transmitted, a number of retry of the current packet may be included, and a communication frequency may be changed based on the number of retry.

According to various embodiments, the parameter may be included in a head field of the data packet.

According to various embodiments, the frequency changer circuit 306 may be configured to change the frequency if it is determined that the parameter is higher than the pre-determined threshold.

Figure 3B:
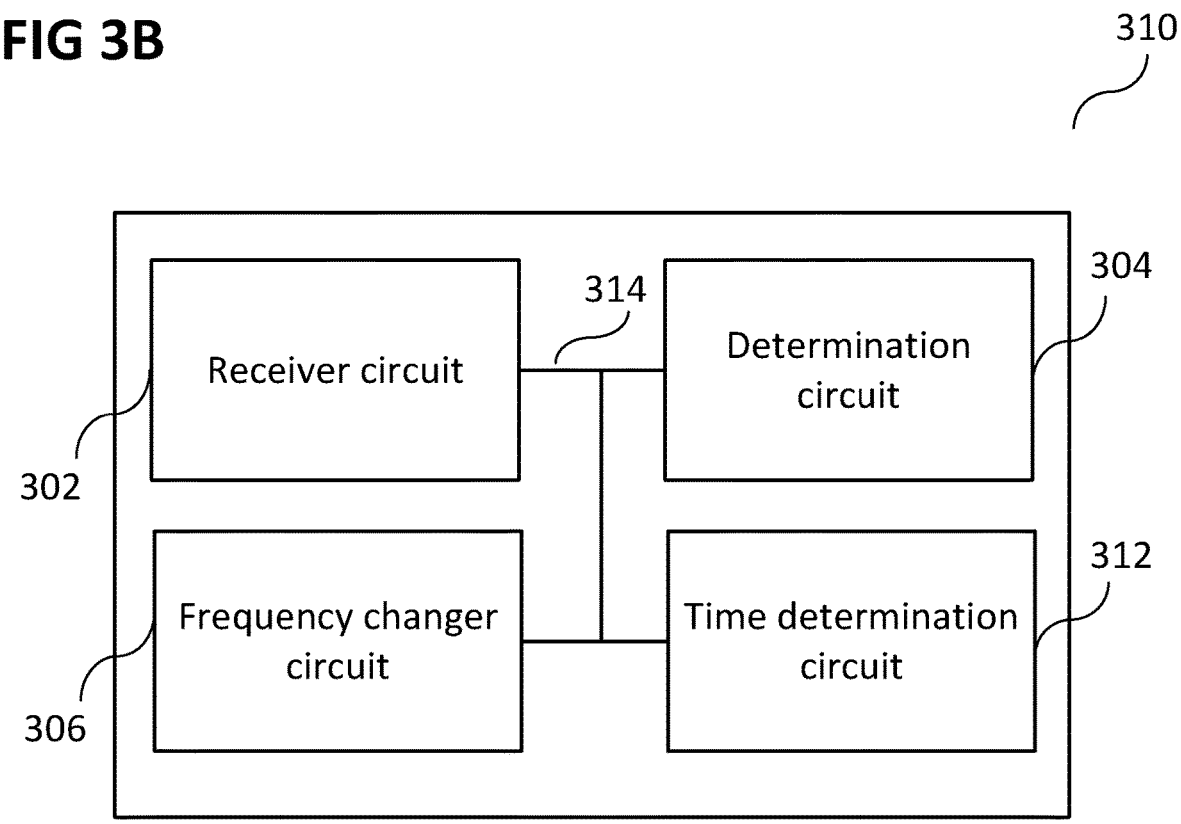
FIG. 3B shows a receiver device according to various embodiments.

FIG. 3B shows a receiver device 310 according to various embodiments. The receiver device 310 may, similar to the receiver device 310 of FIG. 3A, include a receiver circuit 302 configured to receive a data packet according to a data format on a pre-determined radio frequency. The data format may include a parameter indicating a number of retries of transmission of the data packet. The receiver device 310 may, similar to the receiver device 310 of FIG. 3A, further include a determination circuit 304 configured to determine whether the parameter is higher than a pre-determined threshold. The receiver device 310 may, similar to the receiver device 310 of FIG. 3A, further include a frequency changer circuit 306 configured to change a frequency on which the receiver receives data based on the determination. The receiver device 310 may further include a time determination circuit 312, like will be described in more detail below. The receiver circuit 302, the determination circuit 304, the frequency changer circuit 306, and time determination circuit 312 may be coupled with each other, like indicated by lines 314, for example electrically coupled, for example using a line or a cable, and/or mechanically coupled.

According to various embodiments, the time determination circuit 312 may be configured to determine a time since a data packet last was received from a transmitter (for example a transmitter device like described with reference to FIG. 3C below).

According to various embodiments, the frequency changer circuit 306 may be configured to change the frequency if the determined time is higher than a pre-determined timeout time.

According to various embodiments, the pre-determined timeout time may be aligned with the pre-determined threshold.

Figure 3C:
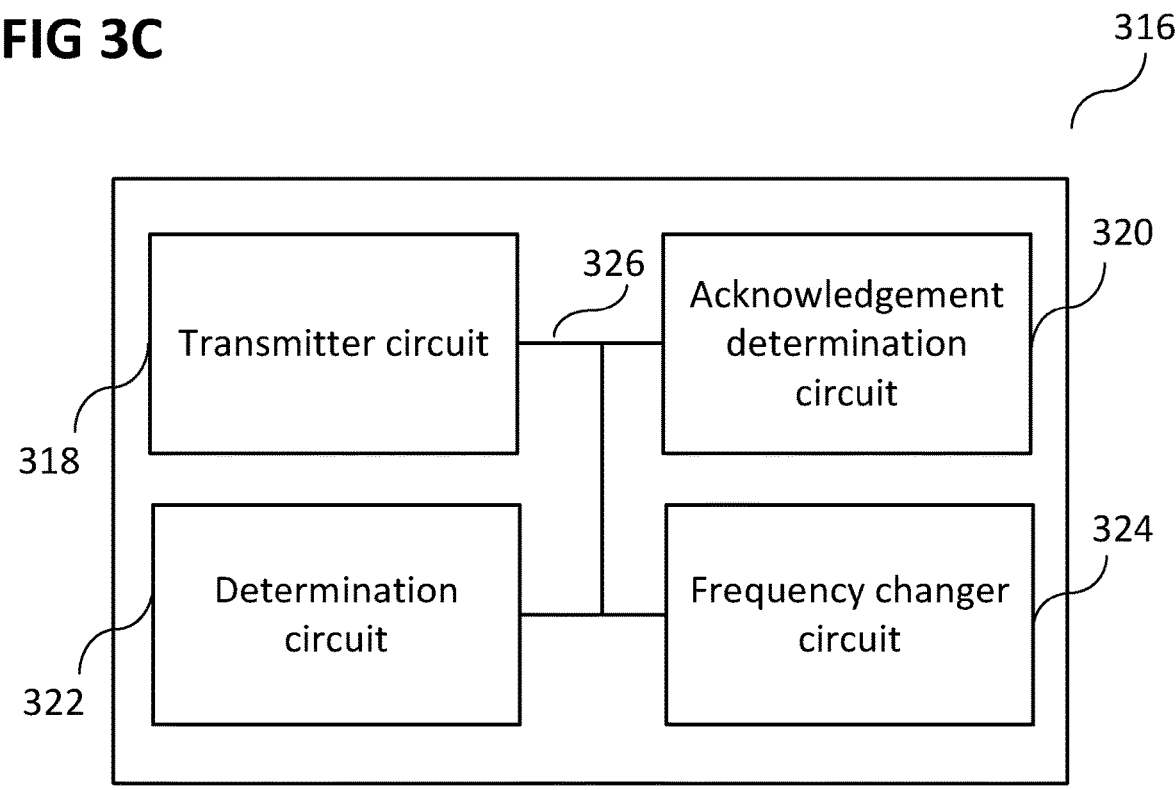
FIG. 3C shows a transmitter device according to various embodiments.

FIG. 3C shows a transmitter device 316 according to various embodiments. The transmitter device 316 may include a transmitter circuit 318 configured to transmit a data packet according to a data format on a pre-determined radio frequency. The data format may include a parameter indicating a number of retries of transmission of the data packet. The transmitter device 316 may further include an acknowledgement determination circuit 320 configured to determine whether an acknowledgement for reception of the data pack is received in the transmitter device 316. The transmitter circuit 318 may be configured to increase the parameter and re-transmit the data packet with the increased parameter if the acknowledgement determination circuit determines 320 that an acknowledgement for reception of the data pack is not received in the transmitter device 316. The transmitter device 316 may further include a determination circuit 322 configured to determine whether the value of the parameter is higher than a pre-determined threshold. The transmitter device 316 may further include a frequency changer circuit 324 configured to change a frequency on which the transmitter transmits data based on the determination. The transmitter circuit 318, the acknowledgement determination circuit 320, the determination circuit 322, and the frequency changer circuit 324 may be coupled with each other, like indicated by lines 326, for example electrically coupled, for example using a line or a cable, and/or mechanically coupled.

According to various embodiments, the parameter may be included in a head field of the data packet.

According to various embodiments, the frequency changer circuit 324 may be configured to change the frequency if it is determined that the parameter is higher than the pre-determined threshold.

According to various embodiments, the pre-determined threshold may be aligned with a pre-determined timeout time in a receiver.

Figure 3D:
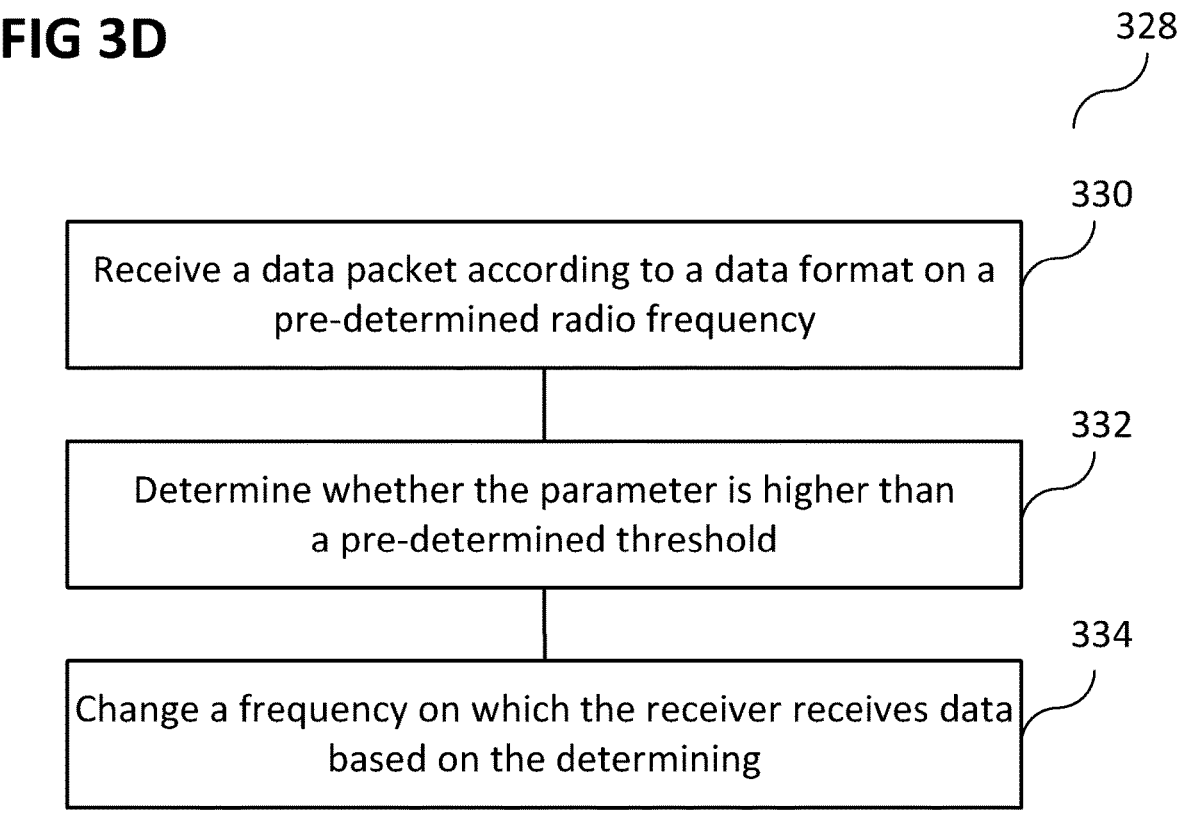
FIG. 3D shows a flow diagram illustrating a method for controlling a receiver device according to various embodiments.

FIG. 3D shows a flow diagram 328 illustrating a method for controlling a receiver device according to various embodiments. In 330, a data packet may be received according to a data format on a pre-determined radio frequency. The data format may include a parameter indicating a number of retries of transmission of the data packet. In 332, it may be determined whether the parameter is higher than a pre-determined threshold. In 334, a frequency on which the receiver receives data may be changed based on the determination.

According to various embodiments, the parameter may be included in a head field of the data packet.

According to various embodiments, the frequency may be changed if it is determined that the parameter is higher than the pre-determined threshold.

According to various embodiments, the method may further include determining a time since a data packet last was received from a transmitter.

According to various embodiments, the frequency may be changed if the determined time is higher than a pre-determined timeout time.

According to various embodiments, the pre-determined timeout time may be aligned with the pre-determined threshold.

Figure 3E:
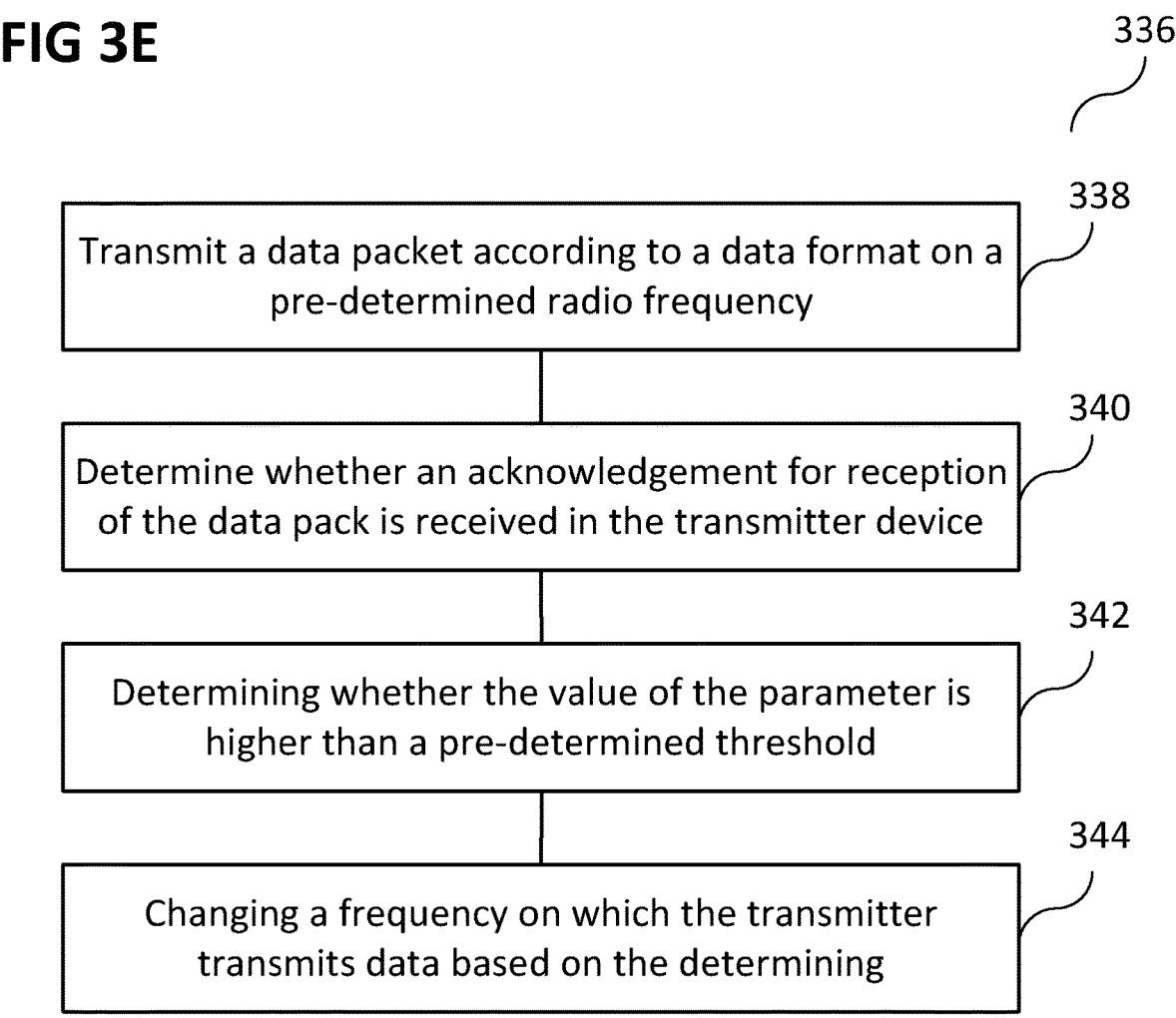
FIG. 3E shows a flow diagram illustrating a method for controlling a transmitter device according to various embodiments.

FIG. 3E shows a flow diagram 336 illustrating a method for controlling a transmitter device according to various embodiments. In 338, a data packet may be transmitted according to a data format on a pre-determined radio frequency. The data format may include a parameter indicating a number of retries of transmission of the data packet. In 340, it may be determined whether an acknowledgement for reception of the data pack is received in the transmitter device. The parameter may be increased and the data packet may be re-transmitted with the increased parameter if it is determined that an acknowledgement for reception of the data pack is not received in the transmitter device. In 342, it may be determined whether the value of the parameter is higher than a pre-determined threshold. In 344, a frequency on which the transmitter transmits data may be changed based on the determining.

According to various embodiments, the parameter may be included in a head field of the data packet.

According to various embodiments, the frequency may be changed if it is determined that the parameter is higher than the pre-determined threshold.

According to various embodiments, the pre-determined threshold may be aligned with a pre-determined timeout time in a receiver.

According to various embodiments, a computer-readable medium may be provided. The computer-readable medium may include instructions which, when executed by a computer, make the computer perform a method for controlling a receiver device. The method may include: receiving a data packet according to a data format on a pre-determined radio frequency, wherein the data format includes a parameter indicating a number of retries of transmission of the data packet; determining whether the parameter is higher than a pre-determined threshold; and changing a frequency on which the receiver receives data based on the determining.

According to various embodiments, the parameter may be included in a head field of the data packet.

According to various embodiments, the frequency may be changed if it is determined that the parameter is higher than the pre-determined threshold.

According to various embodiments, the computer-readable medium may further include instructions which, when executed by a computer, make the computer perform: determining a time since a data packet last was received from a transmitter.

According to various embodiments, the frequency may be changed if the determined time is higher than a pre-determined timeout time.

According to various embodiments, the pre-determined timeout time may be aligned with the pre-determined threshold.

According to various embodiments, a computer-readable medium may be provided. The computer-readable medium may include instructions which, when executed by a computer, make the computer perform a method for controlling a transmitter device. The method may include: transmitting a data packet according to a data format on a pre-determined radio frequency, wherein the data format includes a parameter indicating a number of retries of transmission of the data packet; determining whether an acknowledgement for reception of the data pack is received in the transmitter device, wherein the parameter is increased and the data packet is re-transmitted with the increased parameter if it is determined that an acknowledgement for reception of the data pack is not received in the transmitter device; determining whether the value of the parameter is higher than a pre-determined threshold; and changing a frequency on which the transmitter transmits data based on the determining.

According to various embodiments, the parameter may be included in a head field of the data packet.

According to various embodiments, the frequency may be changed if it is determined that the parameter is higher than the pre-determined threshold.

According to various embodiments, the pre-determined threshold may be aligned with a pre-determined timeout time in a receiver.

Figure 4:
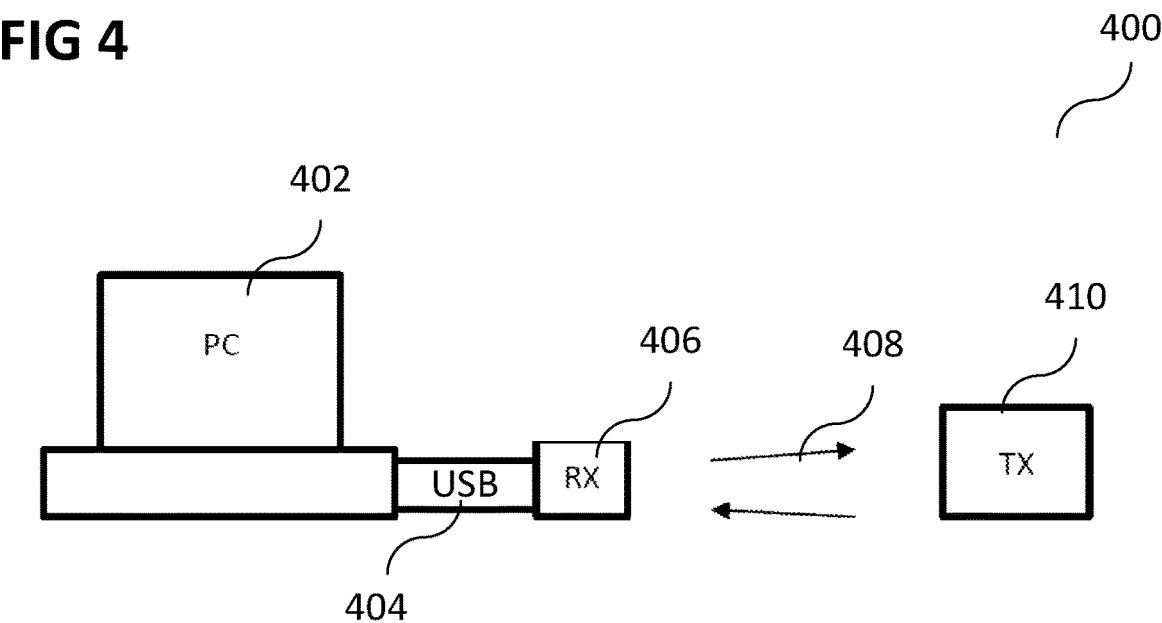
FIG. 4 shows an illustration of a cordless mouse system according to various embodiments.

FIG. 4 shows an illustration 400 of a cordless mouse system according to various embodiments. A receiver 406 may be is connected to a PC (personal computer) host system 402 via a USB (universal serial bus) connector 404. A mouse device (for example a cordless mouse) may transmit the mouse data to the receiver 406 (for example via a transmitter 410 provided in the mouse device; for example wirelessly, like illustrated by arrows 408), and the receiver 406 may send the mouse data to the PC 402 via the USB connection 404.

Figure 5:
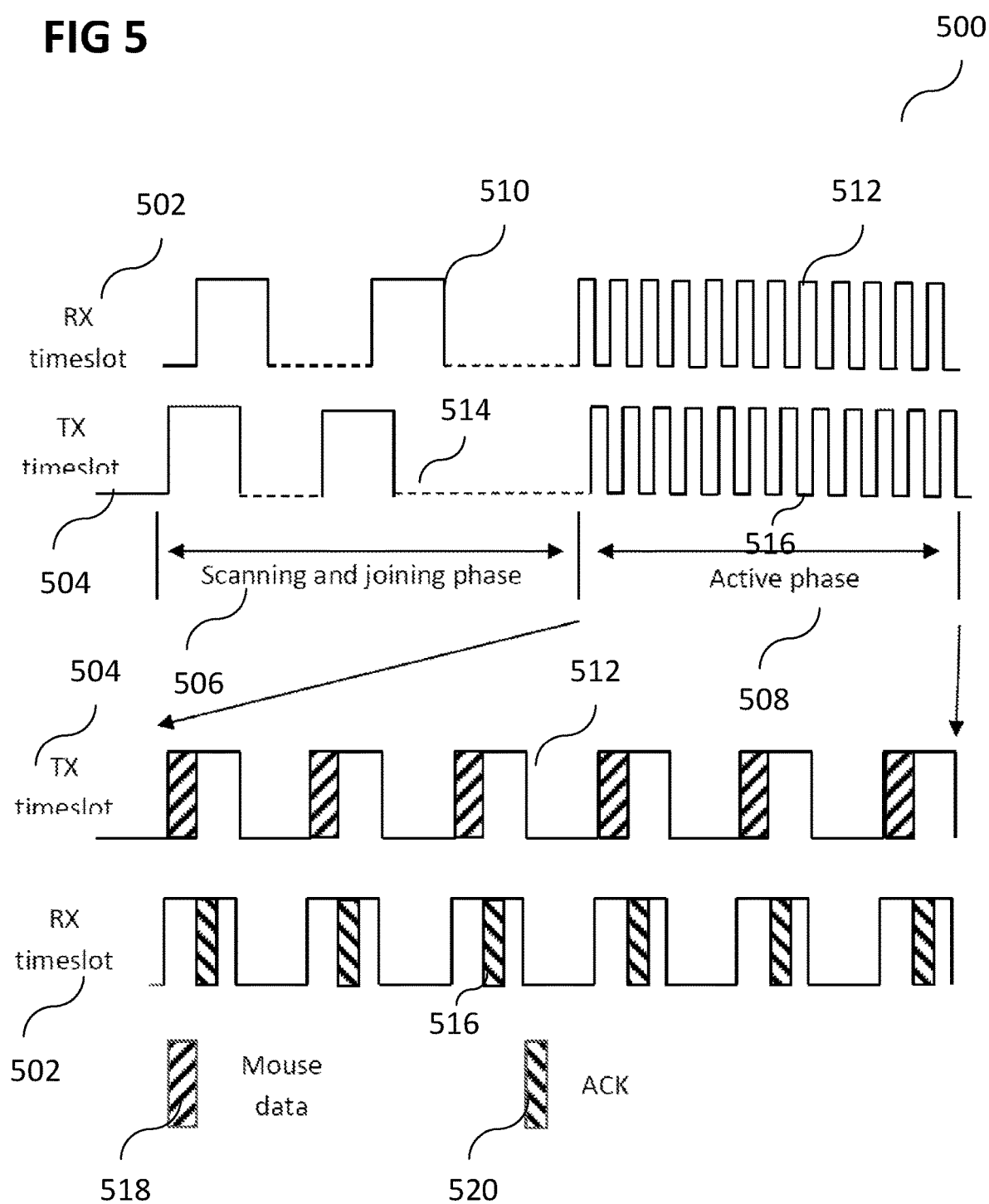
FIG. 5 shows an illustration of clock signals according to various embodiments.

FIG. 5 shows an illustration 500 of clock signals according to various embodiments. The "heartbeat" of the receiver and of the transmitter is the respective periodic timeslot (in other words the respective clock signal). The timeslot (or clock signal) may drive the functions and states of receiver (for example a USB dongle) and of the transmitter (for example provided in a wireless mouse, in other words: a cordless mouse). RX timeslots 502 and TX timeslots 504 are shown. RX timeslots 510 during scanning and joining phase 506 may be longer than RX timeslots 512 during active phase 508. TX timeslots 514 during scanning and joining phase 506 may be longer than TX timeslots 516 during active phase 508. Enlarged portions of TX timeslots 512 and RX timeslots 516 during active phase 508 are illustrated. Mouse data transmitted by the TX is indicated by hatched areas with lines from bottom left to top right (like 518). ACK (acknowledgement) data transmitted by the RX is indicated by hatched areas with lines from top left to bottom right (like 520).

Mouse data is transmitted from the cordless mouse to the receiver unit using a wireless data communication protocol. A data communications protocol may be a set of rules that allow transmitter and receiver to exchange data. A typical set of rules includes data format definition, transmission sequence control and data packet acknowledge.

Automatic Repeat reQuest (ARQ), which may also be referred to as Automatic Repeat Query, is an error-control method for data transmission that uses acknowledgements and timeouts to achieve reliable data transmission over an unreliable service. Acknowledgements may be message sent by the receiver indicating that it has correctly received a data frame or packet. Timeouts may be specified periods of time allowed to elapse before an acknowledgment is to be received. If the sender does not receive an acknowledgment before the timeout, it usually re-transmits the frame/packet until the sender receives an acknowledgment or exceeds a predefined number of re-transmissions.

According to various embodiments, a parameter called "retry count" may be added to the header field, like will be described with reference to FIG. 6 below.

Figure 6:
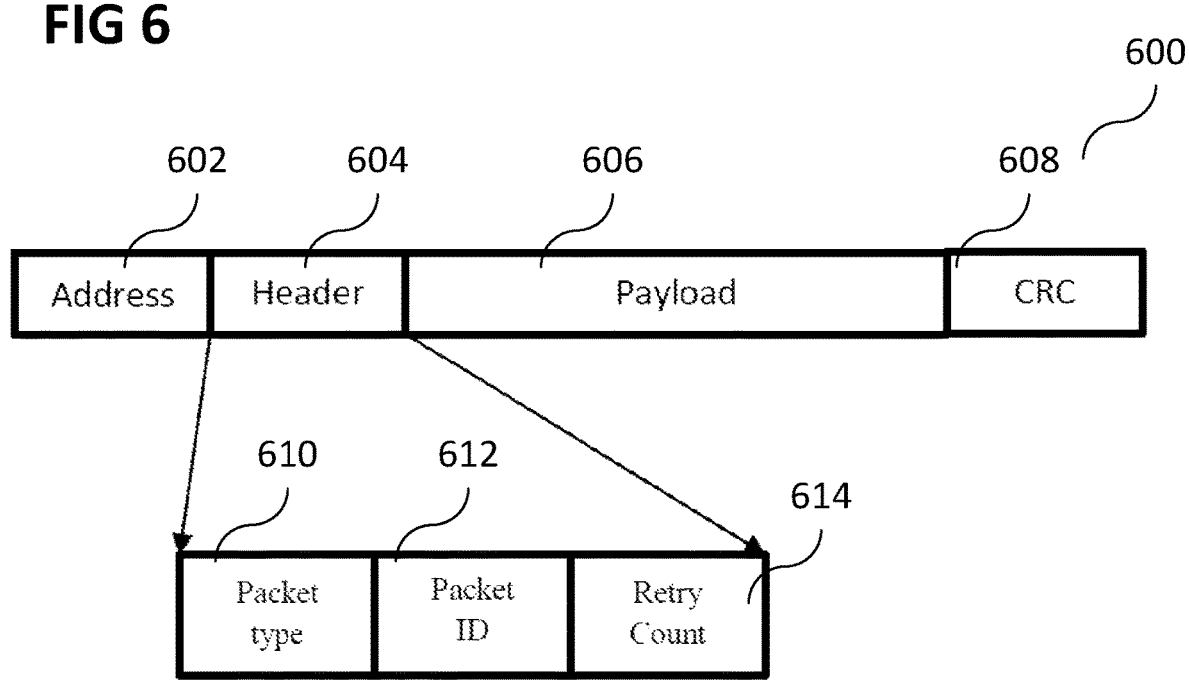
FIG. 6 shows a packet format according to various embodiments.

FIG. 6 shows a packet format 600 according to various embodiments. An address field 602, a header field 604, a payload field 606, and a CRC (cyclic redundancy check) field 608 may be provided. The header field 604 may include a packet type parameter 610, a packet ID (identifier) parameter 612, and a retry count parameter 614.

The parameter "Retry count" 614 may be set by the transmitter when transmitting mouse data to the receiver unit. The parameter "Retry count" 614 may indicate the number of retransmission for the current packet. "Retry count" may be set to '0' for first transmission of the packet. The count value may be incremented accordingly for subsequent re-transmission of the packet. A maximum retry number (N) may be agreed between the transmitter and the receiver. When this maximum retry number is met, both the transmitter and the receiver may switch to the next RF channel, regardless of the result of current transmission.

According to various embodiments, the transmitter and the receiver may switch to the next channel based on the following conditions:

1. The transmitter may switch to the next channel when it exhausts the predefine number of re-transmission;

2. The receiver may switch to the next channel when the timeout period expired or when the receiver receives a packet with maximum number of retry count.

According to various embodiments, the maximum retry count and the maximum timeout period (for the receiver) may be set to an equal value, which allows the transmitter and the receiver to switch channel at the same time (even when the receiver does not receive any data from the transmitter).

Figure 7:
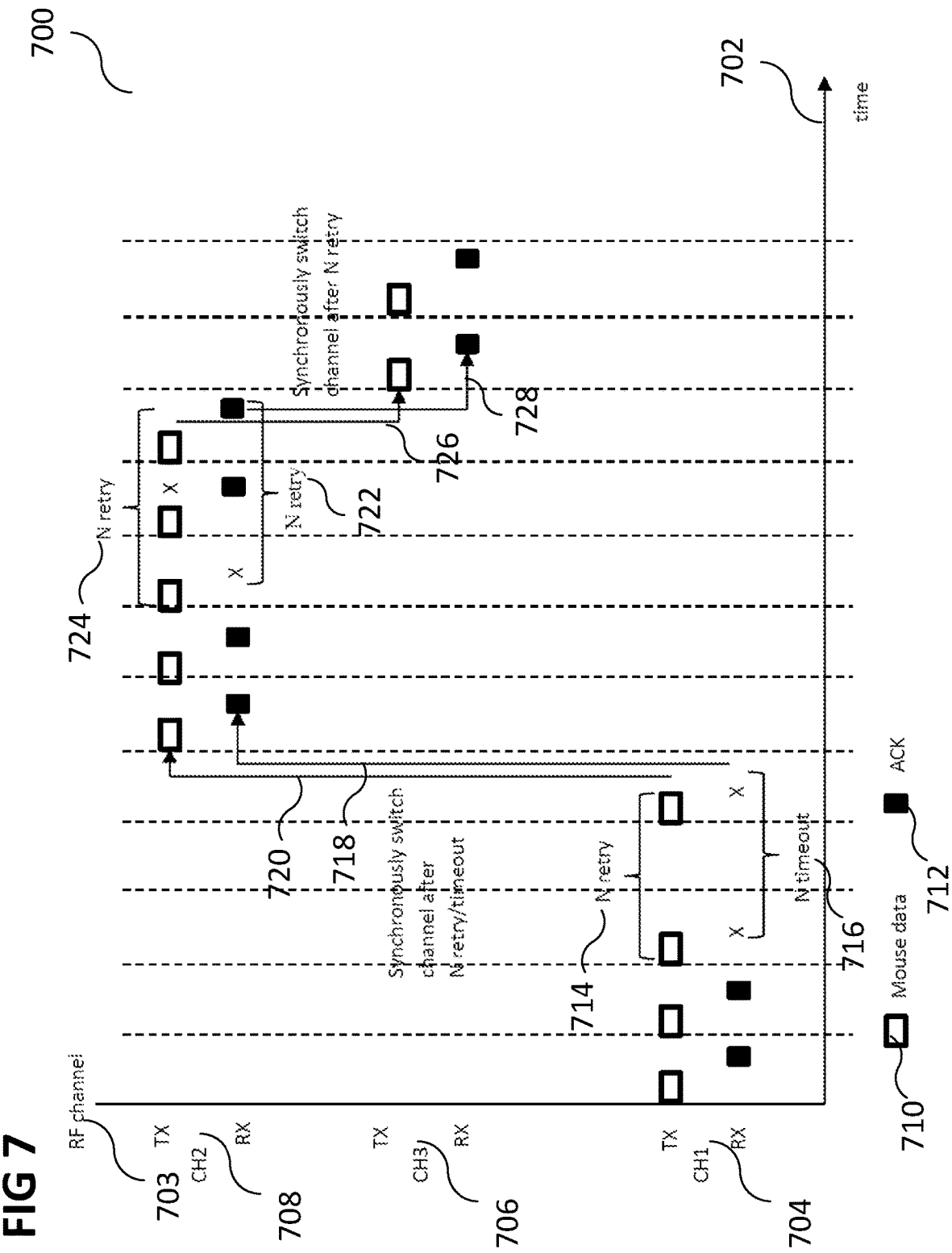
FIG. 7 shows an illustration of a data communication according to various embodiments.

FIG. 7 shows an illustration 700 of a data communication according to various embodiments. A horizontal axis 702 indicates time, and on a vertical axis 703, transmitter (TX) and receiver (RX) channels of a first channel 704, of a second channel 706 and of a third channel 708 are shown. Mouse data is indicated by unfilled boxes (like 710), ACK data is indicated by filled boxes (like 712), and lost data is indicated by X. After N retries 714 of the TX and after a timeout of N 716 in the RX, the TX and RX may synchronously switch channel, like indicated by 718 and 720. After N retries 724 of the TX and after N retries 722 in the RX (which may for example be determined based on the parameter retry count), the TX and RX may synchronously switch channel, like indicated by 726 and 728.

Figure 8:
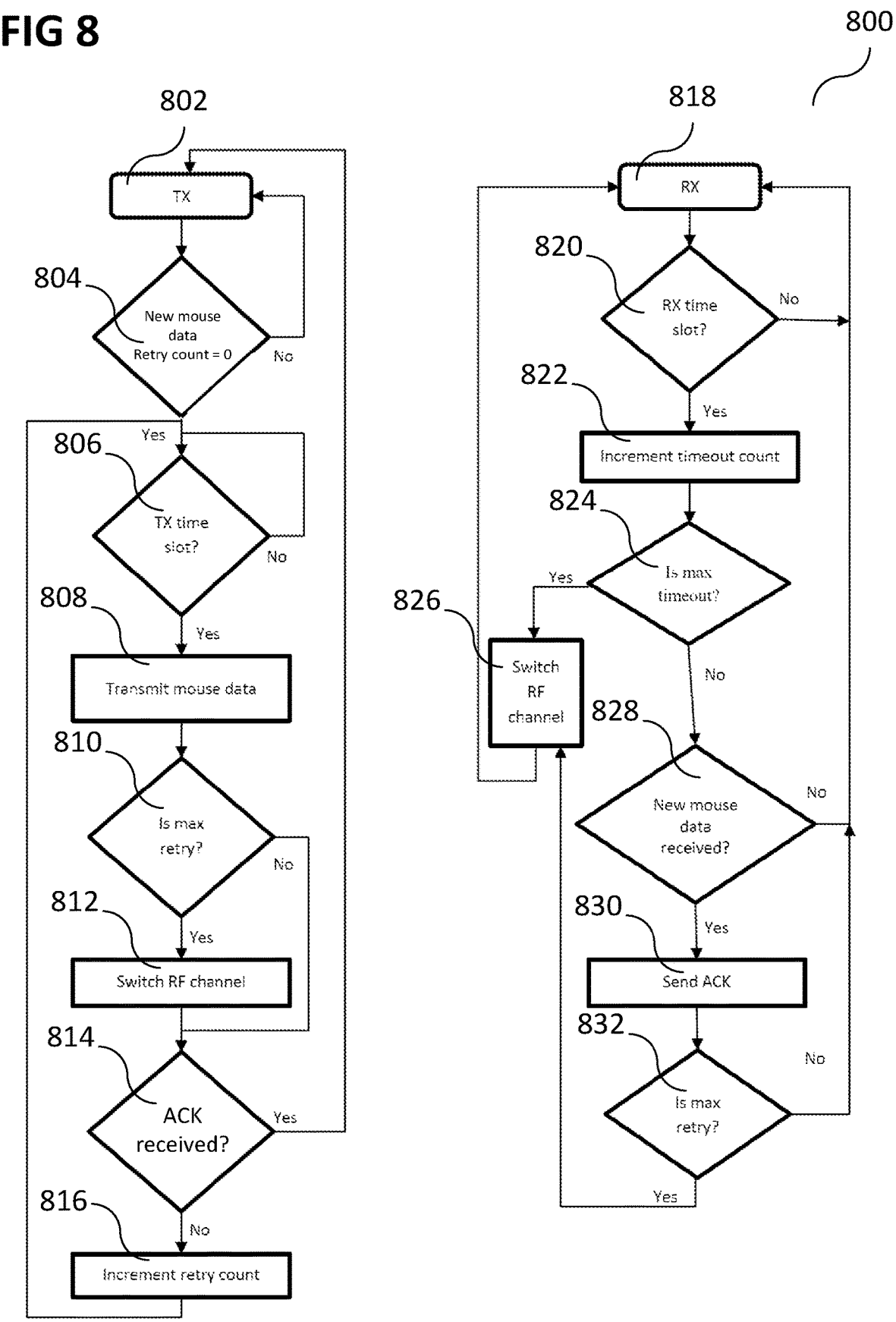
FIG. 8 shows a flow diagram illustrating processing in a transmitter and in a receiver according to various embodiments.

FIG. 8 shows a flow diagram 800 illustrating processing in a transmitter (TX) 802 and in a receiver (RX) 818 according to various embodiments. In 804, the TX may determine whether new mouse data is to be transmitted, and may set retry count to zero. Received. If now new mouse data is to be transmitted, processing may return to 802, otherwise processing may proceed to 806. In 806, it may be determined whether a TX time slow is available. If a TX time slot is not available, processing may proceed with a repetition of 806, otherwise, processing may proceed to 808, where the mouse data is transmitted. In 810, it may be determined whether the maximum number of retries is reached. If the maximum number of retries is achieved, processing may proceed to 812, where the RF channel is switched; otherwise, processing may proceed to 814. In 814, it may be determined whether an ACK is received. If an ACK is received, processing may return to 802; otherwise, processing may proceed to 816, where the retry count is incremented. In 820, it may be determined whether the present time includes an RX time slot (for example according to the clock signals described with reference to FIG. 5 above). If the present time does not include an RX time slot, processing may return to 818, where the timeout counter may be reset (for example set to zero). If the present time includes an RX time slot, processing may proceed to 822, where the timeout count is incremented. In 824, it may be determined whether the maximum timeout has been reached. If the maximum timeout is reached, processing may proceed to 826, where the RF channel is switched. If the maximum timeout is not reached, processing may proceed to 828. In 828, it may be determined whether new mouse data is received. If new mouse data is not received, processing may return to 818. If new mouse data is received, processing may proceed to 830, where an ACK may be sent. In 832, it may be determined whether the maximum number of retries is reached (which may for example be determined based on the parameter retry count). If the maximum number of retries is achieved, processing may proceed to 826, where the RF channel is switched; otherwise, processing may return to 818.

Various embodiments provide devices and methods to synchronize the RF (radio frequency) frequency switching between receiver and transmitter. According to various embodiments, the RF performance (for example data throughput and packet latency) may be improved under a non-ideal environment.

According to various embodiments, the transmitter and receiver may switch to the next frequency channel synchronously without any external/addition information, when the transmission is interfered by undesired signal.

According to various embodiments, mouse data transmission bandwidth may be enhanced by synchronizing the RF channel switching.

According to various embodiments, the out-of-sync periods between transmitter and receiver may be minimized.

According to various embodiments, a true 1000 Hz polling rate may be achieved when a cordless mouse is operated under a noisy RF environment.

According to various embodiments, a wireless mouse frequency channel synchronization method may be provided.

The following examples pertain to further embodiments.

Example 1 is a receiver device comprising: a receiver circuit configured to receive a data packet according to a data format on a pre-determined radio frequency, wherein the data format comprises a parameter indicating a number of retries of transmission of the data packet; a determination circuit configured to determine whether the parameter is higher than a pre-determined threshold; and a frequency changer circuit configured to change a frequency on which the receiver receives data based on the determination.

In example 2, the subject-matter of example 1 can optionally include that the parameter is included in a head field of the data packet.

In example 3, the subject-matter of any one of examples 1 to 2 can optionally include that the frequency changer circuit is configured to change the frequency if it is determined that the parameter is higher than the pre-determined threshold.

In example 4, the subject-matter of any one of examples 1 to 3 can optionally include a time determination circuit configured to determine a time since a data packet last was received from a transmitter.

In example 5, the subject-matter of example 4 can optionally include that the frequency changer circuit is configured to change the frequency if the determined time is higher than a pre-determined timeout time.

In example 6, the subject-matter of example 5 can optionally include that the pre-determined timeout time is aligned with the pre-determined threshold.

Example 7 is a transmitter device comprising: a transmitter circuit configured to transmit a data packet according to a data format on a pre-determined radio frequency, wherein the data format comprises a parameter indicating a number of retries of transmission of the data packet; an acknowledgement determination circuit configured to determine whether an acknowledgement for reception of the data pack is received in the transmitter device, wherein the transmitter circuit is configured to increase the parameter and re-transmit the data packet with the increased parameter if the acknowledgement determination circuit determines that an acknowledgement for reception of the data pack is not received in the transmitter device; a determination circuit configured to determine whether the value of the parameter is higher than a pre-determined threshold; and a frequency changer circuit configured to change a frequency on which the transmitter transmits data based on the determination.

In example 8, the subject-matter of example 7 can optionally include that the parameter is included in a head field of the data packet.

In example 9, the subject-matter of any one of examples 7 to 8 can optionally include that the frequency changer circuit is configured to change the frequency if it is determined that the parameter is higher than the pre-determined threshold.

In example 10, the subject-matter of any one of examples 7 to 9 can optionally include that the pre-determined threshold is aligned with a pre-determined timeout time in a receiver.

Example 11 is a method for controlling a receiver device, the method comprising: receiving a data packet according to a data format on a pre-determined radio frequency, wherein the data format comprises a parameter indicating a number of retries of transmission of the data packet; determining whether the parameter is higher than a pre-determined threshold; and changing a frequency on which the receiver receives data based on the determining.

In example 12, the subject-matter of example 11 can optionally include that the parameter is included in a head field of the data packet.

In example 13, the subject-matter of any one of examples 11 to 12 can optionally include that the frequency is changed if it is determined that the parameter is higher than the pre-determined threshold.

In example 14, the subject-matter of any one of examples 11 to 13 can optionally include determining a time since a data packet last was received from a transmitter.

In example 15, the subject-matter of example 14 can optionally include that the frequency is changed if the determined time is higher than a pre-determined timeout time.

In example 16, the subject-matter of example 15 can optionally include that the pre-determined timeout time is aligned with the pre-determined threshold.

Example 17 is a method for controlling a transmitter device, the method comprising: transmitting a data packet according to a data format on a pre-determined radio frequency, wherein the data format comprises a parameter indicating a number of retries of transmission of the data packet; determining whether an acknowledgement for reception of the data pack is received in the transmitter device, wherein the parameter is increased and the data packet is re-transmitted with the increased parameter if it is determined that an acknowledgement for reception of the data pack is not received in the transmitter device; determining whether the value of the parameter is higher than a pre-determined threshold; and changing a frequency on which the transmitter transmits data based on the determining.

In example 18, the subject-matter of example 17 can optionally include that the parameter is included in a head field of the data packet.

In example 19, the subject-matter of any one of examples 17 to 18 can optionally include that the frequency is changed if it is determined that the parameter is higher than the pre-determined threshold.

In example 20, the subject-matter of any one of examples 17 to 19 can optionally include that the pre-determined threshold is aligned with a pre-determined timeout time in a receiver.

Example 21 is a computer-readable medium comprising instructions which, when executed by a computer, make the computer perform a method for controlling a receiver device, the method comprising: receiving a data packet according to a data format on a pre-determined radio frequency, wherein the data format comprises a parameter indicating a number of retries of transmission of the data packet; determining whether the parameter is higher than a pre-determined threshold; and changing a frequency on which the receiver receives data based on the determining.

In example 22, the subject-matter of example 21 can optionally include that the parameter is included in a head field of the data packet.

In example 23, the subject-matter of any one of examples 21 to 22 can optionally include that the frequency is changed if it is determined that the parameter is higher than the pre-determined threshold.

In example 24, the subject-matter of any one of examples 21 to 23 can optionally include instructions which, when executed by a computer, make the computer perform: determining a time since a data packet last was received from a transmitter.

In example 25, the subject-matter of example 24 can optionally include that the frequency is changed if the determined time is higher than a pre-determined timeout time.

In example 26, the subject-matter of example 25 can optionally include that the pre-determined timeout time is aligned with the pre-determined threshold.

Example 27 is a computer-readable medium comprising instructions which, when executed by a computer, make the computer perform a method for controlling a transmitter device, the method comprising: transmitting a data packet according to a data format on a pre-determined radio frequency, wherein the data format comprises a parameter indicating a number of retries of transmission of the data packet; determining whether an acknowledgement for reception of the data pack is received in the transmitter device, wherein the parameter is increased and the data packet is re-transmitted with the increased parameter if it is determined that an acknowledgement for reception of the data pack is not received in the transmitter device; determining whether the value of the parameter is higher than a pre-determined threshold; and changing a frequency on which the transmitter transmits data based on the determining.

In example 28, the subject-matter of example 27 can optionally include that the parameter is included in a head field of the data packet.

In example 29, the subject-matter of any one of examples 27 to 28 can optionally include that the frequency is changed if it is determined that the parameter is higher than the pre-determined threshold.

In example 30, the subject-matter of any one of examples 27 to 29 can optionally include that the pre-determined threshold is aligned with a pre-determined timeout time in a receiver.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A receiver device comprising:
a receiver circuit configured to receive a data packet according to a data format on a pre-determined radio frequency, wherein the data format comprises a parameter indicating a number of retries of transmission of the data packet;
a determination circuit configured to determine whether the parameter is higher than a pre-determined threshold; and
a frequency changer circuit configured to change a frequency on which the receiver device receives data based on the determination.

2. The receiver device of claim 1,
wherein the parameter is included in a head field of the data packet.

3. The receiver device of claim 1,
wherein the frequency changer circuit is configured to change the frequency if it is determined that the parameter is higher than the pre-determined threshold.

4. The receiver device of claim 1, further comprising:
a time determination circuit configured to determine a time since a data packet last was received from a transmitter.

5. The receiver device of claim 4,
wherein the frequency changer circuit is configured to change the frequency if the determined time is higher than a pre-determined timeout time.

6. The receiver device of claim 5,
wherein the pre-determined timeout time is aligned with the pre-determined threshold.

7. A method for controlling a receiver device, the method comprising:
receiving a data packet according to a data format on a pre-determined radio frequency, wherein the data format comprises a parameter indicating a number of retries of transmission of the data packet;
determining whether the parameter is higher than a pre-determined threshold; and
changing a frequency on which the receiver device receives data based on the determining.

8. The method of claim 7,
wherein the parameter is included in a head field of the data packet.

9. The method of claim 7,
wherein the frequency is changed if it is determined that the parameter is higher than the pre-determined threshold.

10. The method of claim 7, further comprising:
determining a time since a data packet last was received from a transmitter.

11. The method of claim 10,
wherein the frequency is changed if the determined time is higher than a pre-determined timeout time.

12. The method of claim 11,
wherein the pre-determined timeout time is aligned with the pre-determined threshold.

13. A non-transitory computer-readable medium comprising instructions which, when executed by a computer, make the computer perform a method for controlling a receiver device, the method comprising:
receiving a data packet according to a data format on a pre-determined radio frequency, wherein the data format comprises a parameter indicating a number of retries of transmission of the data packet;
determining whether the parameter is higher than a pre-determined threshold; and changing a frequency on which the receiver device receives data based on the determining.

14. The non-transitory computer-readable medium of claim 13,
wherein the parameter is included in a head field of the data packet.

15. The non-transitory computer-readable medium of claim 13,
wherein the frequency is changed if it is determined that the parameter is higher than the pre-determined threshold.

16. The non-transitory computer-readable medium of claim 13, further comprising instructions which, when executed by a computer, make the computer perform:
determining a time since a data packet last was received from a transmitter.

17. The non-transitory computer-readable medium of claim 16,
wherein the frequency is changed if the determined time is higher than a pre-determined timeout time.

18. The non-transitory computer-readable medium of claim 17,
wherein the pre-determined timeout time is aligned with the pre-determined threshold.

* * * * *